US006639005B1

(12) United States Patent
Willenberg et al.

(10) Patent No.: US 6,639,005 B1
(45) Date of Patent: Oct. 28, 2003

(54) THERMOPLASTIC MOLDING COMPOUNDS, PROVIDED WITH AN ANTISTATIC AGENT WHICH EXHIBIT IMPROVED COLOR STABILITY DURING PROCESSING

(75) Inventors: Bernd Willenberg, Bergisch Gladbach (DE); Herbert Eichenauer, Dormagen (DE); Heinrich Alberts, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/958,871

(22) PCT Filed: Apr. 6, 2000

(86) PCT No.: PCT/EP00/03061

§ 371 (c)(1),
(2), (4) Date: Oct. 12, 2001

(87) PCT Pub. No.: WO00/63290

PCT Pub. Date: Oct. 26, 2000

(30) Foreign Application Priority Data

Apr. 19, 1999  (DE) .......................... 199 17 568

(51) Int. Cl.$^7$ ................................. C08L 37/00
(52) U.S. Cl. ..................... 524/515; 525/64; 525/67; 264/102
(58) Field of Search ............... 524/515; 525/64, 525/67; 264/102

(56) References Cited

U.S. PATENT DOCUMENTS

| 4,435,541 A | * | 3/1984 | Brandstetter et al. | .......... 525/64 |
| 4,526,927 A | * | 7/1985 | Hambrecht et al. | .......... 525/68 |
| 4,742,116 A | * | 5/1988 | Schepers et al. | .......... 525/74 |
| 5,061,752 A | * | 10/1991 | Buysch et al. | .......... 525/64 |
| 5,064,899 A |   | 11/1991 | Buysch et al. | .......... 525/64 |
| 5,102,939 A | * | 4/1992 | Eichenauer et al. | .......... 524/291 |
| 5,225,465 A |   | 7/1993 | Eichenauer et al. | .......... 524/100 |
| 5,710,228 A | * | 1/1998 | Krause et al. | .......... 526/262 |
| 6,165,399 A | * | 12/2000 | Guntherberg et al. | .......... 264/102 |

FOREIGN PATENT DOCUMENTS

| DE | 1244398 | 7/1967 |
| DE | 1258083 | 1/1968 |
| DE | 1544652 | 3/1969 |
| EP | 0 603 147 | 6/1994 |
| WO | 00/18841 | 4/2000 |

\* cited by examiner

Primary Examiner—David W. Wu
Assistant Examiner—Henry Hu
(74) Attorney, Agent, or Firm—Joseph C. Gil; Aron Preis

(57) ABSTRACT

A thermoplastic molding composition that exhibits antistatic properties and improved color stability is disclosed. The composition contains a major amount of resinous component that contains A) 0 to 100 % by weight of one or more graft polymers B) 100 to 0 % by weight of a thermoplastic vinyl (co)polymer, and a minor amount of a mixture of a) a modified or unmodified polyalkylene ethers and b) a phenolic oxidant wherein the weight ratio (a):(b) is 20:1 to 1:1.

6 Claims, No Drawings

THERMOPLASTIC MOLDING COMPOUNDS, PROVIDED WITH AN ANTISTATIC AGENT WHICH EXHIBIT IMPROVED COLOR STABILITY DURING PROCESSING

This invention relates to thermoplastic moulding compositions to which antistatic properties are imparted and which exhibit improved colour stability during processing, and which are based on polymers, which are optionally modified with rubber, of aromatic vinyl compounds, e.g. styrene and/or α-methylstyrene and acrylonitrile and/or acrylates, which contain a specially formulated combination comprising an antistatic agent and a phenolic antioxidant.

On account of their chemical constitution, most plastics are electrical insulators which exhibit a high electrical surface resistance. During the processing and use of compositions such as these, this readily results in electrostatic charging of the plastics surfaces. In practice this often leads to defects and contamination, e.g. to the rapid soiling of plastics parts and to the contamination thereof by dust, whereupon characteristic dust patterns are formed at the surface. This also applies in particular to polymers of aromatic vinyl compounds and acrylonitrile which are optionally modified with rubber and which are used as moulding compositions, e.g. styrene-acrylonitrile copolymers (SAN) and graft polymers of styrene and acrylonitrile on polybutadiene (ABS).

It is known that antistatic properties can be imparted to moulding compositions such as these. Examples of recommended antistatic agents include alkyl and aryl sulphonates (DE-OS 1 544 652), amines (DE-PS 1 258 083), quaternary amnonium salts, amides and phosphoric acids, as well as alkyl and aryl phosphonates and polyethers (DE-PS 1 244 398) and products produced by the graft polymerisation of styrene and acrylonitrile on to polyethers such as these (EP-A 61 692).

Polyethers modified with radical-formers have proved particularly useful (EP-A 278 349).

However, when these materials are used, just as when unmodified polyethers are used as antistatic agents, unsatisfactory colour stability of moulding compositions to which antistatic properties are imparted can occur during processing, despite the use of polymer starting materials which are stabilised in the optimum manner.

Surprisingly, it has now been found that a very good combination of an antistatic effect and a high level of colour stability is achieved, without a negative effect on other properties, if a specially formulated combination comprising an antistatic agent based on polyethers and a special phenolic antioxidant is used.

The present invention relates to thermoplastic moulding compositions containing

I.) 99.90 to 95 parts by weight, preferably 99.75 to 96 parts by weight, and most preferably 99.50 to 97 parts by weight, of a polymer, which is optionally modified with rubber, of aromatic vinyl compounds and optionally of other vinyl monomers, which consists of A) 0 to 100 % by weight of one or more graft polymers formed from 10 to 95 % by weight (with respect to A) of rubber and 90 to 5 % by weight (with respect to A) of monomers which are graft-polymerised on to the rubber, wherein styrene, α-methylstyrene, styrenes comprising a substituted nucleus, methyl methacrylate, (meth)acrylonitrile, maleic anhydride, N-substituted maleinimide or mixtures thereof are graft-polymerised as monomers and the rubbers have glass transition temperatures <10° C. and are present in the form of at least partially crosslinked particles with an average particle diameter ($d_{50}$) of 0.05 to 20 μm, and B) 100 to 0 % by weight of one or more thermoplastic vinyl polymers, wherein the monomers are selected from the series comprising styrene, α-methylstyrene, styrenes comprising a substituted nucleus, methyl methacrylate, acrylonitrile, methacrylonitrile, maleic anhydride, N-substituted maleinimide or mixtures thereof, and II.) 0.10 to 5 parts by weight, preferably 0.25 to 4 parts by weight, and most preferably 0.5 to 3 parts by weight, of a mixture of a) a component selected from at least one of the group comprising unmodified polyalkylene ethers, polyalkylene ethers modified with radical-formers, and polyalkylene ethers modified with acid groups (each with (number average) molecular weights between 500 and 20,000), and b) a phenolic antioxidant selected from octadecyl-3-(3', 5'-di-tert.-butyl-4-hydroxyphenyl) propionate and 2,4-di-methyl-6-(1-methylpentadecyl)-phenol or mixtures thereof, wherein the ratio by weight of (a):(b) is 20:1 to 1:1.

The present invention further relates to a process for producing improved polymers, which are optionally modified with rubber, of aromatic vinyl compounds and other vinyl monomers as described above, which is characterised in that 0.10 to 5 parts by weight of a mixture of a) a component selected from at least one of the group comprising unmodified polyalkylene ethers, polyalkylene ethers modified with radical-formers, and polyalkylene ethers modified with acid groups (each with (number average) molecular weights between 500 and 20,000), and b) a phenolic antioxidant selected from octadecyl-3-(3', 5'-ditert.-butyl-4-hydroxyphenyl) propionate and 2,4-di-methyl-6-(1-methylpentadecyl)-phenol or mixtures thereof, wherein the ratio by weight of (a):(b) is 20:1 to 1:1, is added to 99.90 to 95 parts by weight of polymer I.) and is mixed in the molten state.

In the sense of the present invention, copolymers (I), which are optionally modified with rubber, of aromatic vinyl compounds and other vinyl monomers are mixtures of A) 0 to 100 % by weight of one or more graft polymers and (B) 100 to 0 % by weight of one or more thermoplastic vinyl polymers. Graft polymers (A) in the sense of the invention are those in which either styrene, α-methylstyrene, methyl methacrylate or a mixture of 95 to 50 % by weight styrene, α-methylstyrene, styrenes comprising a substituted nucleus, methyl methacrylate or mixtures thereof and 5 to 50 % by weight (meth)acrylonitrile, maleic anhydride, N-substituted maleimide or mixtures thereof are graft-polymerised on to a rubber.

Suitable rubbers include practically all rubbers which have glass transition temperatures <10° C. Examples comprise polybutadiene, polyisoprene, styrene-butadiene copolymers, acrylonitrile-butadiene copolymers, acrylate rubbers, EPM rubbers, (ethylene-propylene rubbers), and EPDM rubbers (ethylene-propylene-diene rubbers) which contain, as the diene, an unconjugated diene such as 1,5-hexadiene or norbornadiene in small amounts. Diene rubbers are preferred.

Graft polymers (A) contain 10 to 95 % by weight, particularly 20 to 70 % by weight, of rubber and 90 to 5 % by weight, particularly 80 to 30 % by weight, of graft-copolymerised monomers. In these graft copolymers, the rubbers are present in the form of at least partially crosslinked particles with an average particle diameter ($d_{50}$) from 0.05 to 20 μm, preferably from 0.1 to 2 μm, and most preferably from 0.1 to 0.8 μm.

The average particle diameter $d_{50}$ is the diameter above and below which 50 % by weight of the particles are to be found in each case. It can be determined by means of ultracentrifuge measurements (W. Scholtan, H. Lange, Kolloid-Z. and Z. Polymere 250 (1972), 782–796).

Graft copolymers of this type can be produced by the radical-initiated graft copolymerisation of styrene, α-methylstyrene, styrenes comprising a substituted nucleus, (meth)acrylonitrile, methyl methacrylate, maleic anhydride or N-substituted maleinimide in the presence of the rubber on to which grafting is to occur. The preferred methods of production are emulsion, solution, bulk or suspension polymerisation.

Copolymers (B) can be synthesised by polymerisation from the graft monomers for (A) or from similar monomers, and can be synthesised in particular from styrene, α-methylstyrene, styrenes comprising a substituted nucleus, acrylonitrile, (meth)acrylonitrile, methyl methacrylate, maleic anhydride, vinyl acetate, N-substituted maleinimide or mixtures thereof. These copolymers are preferably copolymers which are formed from 95 to 50, preferably 60 to 80 % by weight styrene, α-methylstyrene, methyl methacrylate or mixtures thereof with 5 to 50, preferably 40 to 20 % by weight of acrylonitrile, methacrylonitrile, methyl methacrylate, maleic anhydride or mixtures thereof. Copolymers such as these are also formed as by-products during graft copolymerisation. In addition to the copolymers which are contained in the graft polymer, it is also customary to admix copolymers which have been produced separately.

The latter do not have to be identical to the ungrafted resin constituents which are present in the graft polymer. Suitable copolymers which are produced separately are resin-like, thennoplastic and free from rubber, and in particular comprise copolymers of styrene and/or α-methylstyrene with acrylonitrile, optionally in admixture with methyl methacrylate. Copolymers which are particularly preferred consist of 20 to 40 % by weight acrylonitrile and 80 to 60 % by weight styrene or α-methylstyrene. Copolymers such as these are known and can be produced in particular by radical-initiated polymerisation, particularly by emulsion, suspension, solution or bulk polymerisation. These copolymers preferably have molecular weights ($M_w$) from 15,000 to $2.10^5$ as determined by light scattering or gel permeation chromatography.

The production of these graft and copolymers is generally known (see, for example, DE-OS 1 694 173 ( U.S. Pat. No. 3,564,077), DE-OS 2 348 377 ( U.S. Pat. No. 3,919,353), DE-OS 2 035 390 ( U.S. Pat. No. 3,644,574). DE-OS 2 228 242 (=GB- 1 409 275)).

Examples of polyalkylene ethers a) which are suitable as component II.) according to the invention are unmodified polyalkylene ethers which are synthesised from di- and polyfunctional aliphatic or cycloaliphatic radicals and which can also contain small amounts of olefinic groups.

Suitable examples thereof include the reaction products of various di- or polyols, ethylene glycol, 1,2-propylene glycol, trimethylolpropane, glycerol, pentaerythritol, sorbitol and mannitol and one or more ethylene oxides such as ethylene oxide and propylene oxide (for the production and use thereof, see Ullmanns Encyklopädie der technischen Chemie, 4th Edition, Volume 19, page 31, Verlag Chemie, Weinheim 1980). Polyalkylene ethers with high contents of 1,2-propylene structures are preferred.

Both linear and branched polyalkylene ethers can be used, wherein moderately branched and linear types are preferred.

The unmodified polyalkylene ethers have (number average) molecular weights between 500 and 20,000, preferably between 1000 and 15,000, more preferably between 2000 and 10,000, most preferably between 2000 and 5000. The molecular weights are usually determnined by measuring the OH number.

Polyalkylene ethers which are modified with radical-formers and polyalkylene ethers which are modified with acid groups are also suitable as component II.a). Polyalkylene ethers which are modified with radical-formers are described in EP-A 278 349. This reference forms a subject of the present disclosure ("incorporated by reference").

The aforementioned unmodified polyalkylene ethers are employed as a starting material for the production of the polyalkylene ethers which are modified with acid groups.

Carboxylic acids which are suitable in principle for treating these unmodified polyalkylene ethers include aliphatic carboxylic acids, preferably those comprising 1 to 20 carbon atoms, aromatic and araliphatic carboxylic acids, and anhydrides thereof. Saturated and unsaturated mono-, di- and tricarboxylic acids can be used for this purpose.

Examples of suitable carboxylic acids include formic acid, acetic acid, propionic acid, trimethylacetic acid, lauric acid, oleic acid, stearic acid, oxalic acid, malonic acid, succinic acid, glutaric acid, adipic acid, maleic acid, fumaric acid, benzoic acid, phenylacetic acid, o-, m- or p-toluic acid, phthalic acid, isophthalic acid and terephthalic acid.

Examples of suitable carboxylic anhydrides include acetic anhydride, maleic anhydride and phthalic anhydride.

In principle, carboxylic acid derivatives are also suitable, such as hydroxycarboxylic acids (e.g. glycolic acid, lactic acid, hydroxybutyric acid, glyceric acid, malic acid, tartaric and citric acid, mandelic acid, salicylic acid or 2,2'-thiodiacetic acid and 3,3'-thiodipropionic acid).

The carboxylic acids which are preferred in the sense of the present invention are formic acid, acetic acid, propionic acid, oxalic acid, benzoic acid and phthalic acid. Formic acid, acetic acid, oxalic acid and benzoic acid are particularly preferred. Acetic acid is most particularly preferred.

The carboxylic anhydrides which are preferred in the sense of the present invention are acetic anhydride and phthalic anhydride Treatment of the polyalkylene ethers with a carboxylic acid or carboxylic anhydride is generally conducted at temperatures from 20° C. to 100° C., preferably from 25° C. to 90° C., more preferably from 30° C. to 80° C. and most preferably from 40° C. to 60° C.

The amount of carboxylic acid or carboxylic anhydride with respect to the amount of polyalkylene ether can be varied within wide limits, and generally ranges from 0.01 to 3% by weight, preferably from 0.02 to 2% by weight, most preferably from 0.05 to 1% by weight.

The phenolic antioxidants II.b) which are suitable according to the invention are octadecyl-3-(3',5'-di-tert.-butyl-4-hydroxyphenyl) propionate and 2,4-dimethyl-6-(1-methylpentadecyl)-phenol or mixtures thereof. These compounds are generally known and are commercially available (see the Examples).

Components a) and b) in II) are used in a ratio by weight of (a):(b)=20:1 to 1:1, preferably 15:1 to 2:1, most preferably 10:1 to 3:1.

II.) can be incorporated in I.) by any known methods. Thus, if component I.) exists in the form of an emulsion (e.g. after the production of I.) by the known emulsion polymerisation method), component II.) can be added to the emulsion. It is also possible to add one of the components which are present in II.) to the emulsion and to incorporate the other component into the melt.

II.) is preferably incorporated by kneading, rolling or extruding it jointly into the polymers to which antistatic properties are to be imparted.

In addition to component II.), customary additives, such as pigments, fillers, internal lubricants, demoulding agents, flame retardants and the like, for example, can also be added to the moulding compositions according to the invention.

The moulding compositions according to the invention which are obtained in this manner are processed to form finished components (e.g. housing parts for domestic and electrical appliances, sectional parts, sheeting, automobile interior trim, etc.) by methods which are customary for thermoplastics (e.g. injection moulding, extrusion, etc.).

The finished mouldings are distinguished by their outstanding antistatic properties and by their very high colour stability during processing, whilst their other properties (mechanical strength, dimensional stability when hot, thermoplastic processability) are not impaired.

EXAMPLES

Material Used

ABS Polymer 1

An ABS polymer synthesised from 70 parts by weight of a thermoplastic styrene/acrylonitrile copolymer (styrene:acrylonitrile ratio by weight=72:28, number average molecular weight $M_w$=85,000 as determined by gel permeation chromatography) and 30 parts by weight of a graft polymer of 32.4 parts by weight styrene and 12.6 parts by weight acrylonitrile on 55 parts by weight polybutadiene with a bimodal particle size distribution (50% with a $d_{50}$ value of about 400 nm and 50% with a $d_{50}$ value of about 100 nm), the graft polymer being stabilised with 0.8% of octadecyl-3-(3',5'-di-tert.-butyl-4-hydroxyphenyl) propionate (Irganox 1076, Ciba, Basle, Switzerland).

ABS Polymer 2

An ABS polymer which was synthesised analogously to ABS polymer 1, the graft polymer being stabilised with 0.8% of a mixture of 2,4-dimethyl-6-(1-methylpentadecyl)-phenol and octadecyl-3-(3',5'-di-tert.-butyl-4-hydroxyphenyl) propionate (in a ratio by weight of 4:1; Irganox 1141, Ciba, Basle, Switzerland).

ABS Polymer 3

An ABS polymer which was synthesised analogously to ABS polymer 1, the graft polymer being stabilised with 0.4% of 2,2'-methylene-bis-(4-methyl-6-cyclohexyl-phenol) (Vulkanox ZKF; Bayer AG, Leverkusen, Germany).

ABS Polymer 4

An ABS polymer which was synthesised analogously to ABS polymer 1, the graft polymer being stabilised with 0.4% 4,4'-thiobis(6-tert.-butyl-m-cresol) (Santonox TBMC, Flexsys GmbH & Co. KG, Nienburg, Germany).

Polyalkylene Ether 1

A linear polypropylene ether with an average molecular weight $M_n$=2000 (OH number=57) which was modified with dibenzoyl peroxide as a radical-former according to EP-A 278 349.

Polyalkylene Ether 2

A linear polypropylene ether with an average molecular weight $M_n$=4200 (OH number=27) (Desmophen 5168, Bayer AG, Leverkusen, Germany).

Antistatic Agent (Comparison)

Tris-hydroxyethylated dodecylamine

Phenolic Antioxidant (AO) 1

Octadecyl-3-(3',5-di-tert.-butyl-4-hydroxyphenyl) propionate (Irganox 1076, Ciba, Basle, Switzerland).

Phenolic Antioxidant (AO) 2 (Comparison)

2,2'-methylene-bis-(4-methyl-6-cyclohexyl-phenol) (Vulkanox ZKF, Bayer AG. Leverkusen, Germany). Phenolic antioxidant (AO) 3

2,4-dimethyl-6-(1-methylpentadecyl)-phenol (80 % content thereof in Irganox 1141, Ciba, Basle, Switzerland).

Phenolic Antioxidant (AO) 4 (Comparison)

4,4'-thiobis-(6-tert.-butyl-m-cresol) (Santonox TBMC, Flexsys GmbH & Co. KG, Nienburg, Germany).

Production of Moulding Compositions to Which Antistatic Properties Were Imparted The ABS polymers were mixed, together with 2 parts by weight of ethylene-bis-stearylamide and 0.15 parts by weight of a silicone oil, and with the components given in Table I, at about 190° C. to 200° C. in an internal kneader of the Banbury type. The resulting compositions, which were converted into granules, were processed by injection moulding at 240° C. or 280° C. to form mouldings of dimensions 140 mm×75 mm×2 mm.

The colour stability during processing was determined by measuring the yellowness index (YI) according to ASTM Standard D 1925 (type of light: C; observer: 2°, measurement aperture: large area value), corresponding to the equation YI=(128X−106Z)/Y, where X, Y, Z=colour coordinates according to DIN 5033, on parts which were obtained after the injection moulding procedure and after holding said parts in an oven at 100° C. for 5 hours (see Table 2).

The antistatic effect was determined by storing the parts in a dust-laden environment for 2 weeks (+=very good antistatic effect, no dust patterns, −=poor antistatic effect, dust patterns).

The results listed in Table 2 show that it is only the moulding compositions according to the invention which exhibit good processing stability (practically no change in yellowness index on increasing the processing temperature), good stability when stored hot (a maximum change in yellowness index of about 5 units), and a good antistatic effect at the same time.

TABLE 1

Mixtures used for the production of moulding compositions according to the invention

| Example | ABS polymer 1 (pts. wt.) | ABS polymer 2 (pts. wt.) | ABS polymer 3 (pts. wt.) | ABS polymer 4 (pts. wt.) | Polyalkylene ether 1 (pts. wt.) | Polyalkylene ether 2 (pts. wt.) | Antistatic agent (comp.) (pts. wt.) | Phenol AO 1 (pts. wt.) | Phenol AO 2 (pts. wt.) | Phenol AO 3 (pts. wt.) | Phenol AO 4 (pts. wt.) |
|---|---|---|---|---|---|---|---|---|---|---|---|
| 1*) | 100 | — | — | — | 1.5 | — | — | 0.24**) | — | — | — |
| 2 (comp.)*) | — | — | 100 | — | 1.5 | — | — | — | 0.12**) | — | — |

TABLE 1-continued

Mixtures used for the production of moulding compositions according to the invention

| Example | ABS polymer 1 (pts. wt.) | ABS polymer 2 (pts. wt.) | ABS polymer 3 (pts. wt.) | ABS polymer 4 (pts. wt.) | Polyalkylene ether 1 (pts. wt.) | Polyalkylene ether 2 (pts. wt.) | Antistatic agent (comp.) (pts. wt.) | Phenol AO 1 (pts. wt.) | Phenol AO 2 (pts. wt.) | Phenol AO 3 (pts. wt.) | Phenol AO 4 (pts. wt.) |
|---|---|---|---|---|---|---|---|---|---|---|---|
| 3 (comp.)*) | 100 | — | — | — | — | — | — | 0.24**) | — | — | — |
| 4 (comp.)*) | — | — | 100 | — | — | — | — | — | 0.12**) | — | — |
| 5 (comp.)*) | 100 | — | — | — | — | — | 1 | 0.24**) | — | — | — |
| 6 (comp.)*) | — | — | 100 | — | — | — | 1 | — | 0.12**) | — | — |
| 7 | — | — | 100 | — | 1.5 | — | — | 0.5 | 0.12**) | — | — |
| 8 (comp.) | — | — | 100 | — | — | — | 1 | 0.5 | 0.12**) | — | — |
| 9 (comp.) | — | — | 100 | — | 1.5 | — | — | — | 0.5 + 0.12**) | — | — |
| 10 | 100 | — | — | — | — | 1.5 | — | 0.24**) | — | — | — |
| 11 | — | 100 | — | — | 1.5 | — | — | 0.048**) | — | 0.192**) | — |
| 12 | — | 100 | — | — | — | 1.5 | — | 0.048**) | — | 0.192**) | — |
| 13 (comp.) | — | 100 | — | — | — | — | 1 | 0.048**) | — | 0.192**) | — |
| 14 (comp.) | — | — | — | 100 | 1.5 | — | — | — | — | — | 0.12**) |
| 15 (comp.) | — | — | — | 100 | — | 1.5 | — | — | — | — | 0.12**) |

*)0.5 parts by weight magnesium stearate were additionally used during the production of these moulding compositions
**)contained in the ABS polymer used in each case

TABLE 2

Properties of ABS moulding compositions investigated

| Example | YI after processing at 240° C. | YI after processing at 280° C. | YI after storage in an oven (5 hours at 100° C.) | Antistatic properties |
|---|---|---|---|---|
| 1 | 34 | n.d. | 37 | + |
| 2 (comparison) | 38 | n.d. | 45 | + |
| 3 (comparison) | 35 | n.d. | 40 | − |
| 4 (comparison) | 35 | n.d. | 40 | − |
| 5 (comparison) | 40 | n.d. | 49 | + |
| 6 (comparison) | 41 | n.d. | 48 | + |
| 7 | 33 | n.d. | 36 | + |
| 8 (comparison) | 39 | n.d. | 50 | + |
| 9 (comparison) | 38 | n.d. | 46 | + |
| 10 | 29 | 28 | 32 | + |
| 11 | 33 | 31 | 36 | + |
| 12 | 26 | 27 | 31 | + |
| 13 (comparison) | 39 | 38 | 46 | + |
| 14 (comparison) | 38 | 39 | 48 | + |
| 15 (comparison) | 40 | 40 | 50 | + | n.d. = not determined

What is claimed is:

1. A thermoplastic molding composition comprising
   I.) 99.90 to 95 parts by weight of resinous component that contains
      A) 0 to 100% by weight of one or more graft polymers of 10 to 95% by weight (with respect to A) of an at least partially crosslinked rubber having glass transition temperatures <10° C., said rubber having an average particle diameter of 0.05 to 20 μm, and 90 to 5% by weight (with respect to A) of a grafted phase polymerized of at least one member selected from the group consisting of styrene, α-methyl styrene, nucleus-substituted styrene, methyl methacrylate, (meth)acrylonitrile, maleic anhydride and N-substituted maleimide and
   B) 100 to 0% by weight of a thermoplastic vinyl (co)polymer polymerized of at least one member selected from the group consisting of styrene, (α-methylstyrene, nucleus-substituted styrene, methyl methacrylate, acrylonitrile, methacrylonitrile, maleic anhydride and N-substituted maleimide, and
   II.) 0.10 to 5 parts by weight of a mixture of
      a) at least one component having a number average molecular weight of 500 to 20,000 selected from the group consisting of unmodified polyalkylene ethers, polyalkylene ethers modified with radical-formers, and polyalkylene ethers modified with acid groups, and
      b) at least one phenolic antioxidant selected from the group consisting of octadecyl-3-(3',5'-di-tert.-butyl-4-hydroxyphenyl)propionate and 2,4-di-methyl-6-(1-methylpentadecyl)-phenol,
   wherein the ratio by weight of (a):(b) is 20:1 to 1:1.

2. The thermoplastic molding composition of claim 1 wherein said I) is present in an amount of 99.75 to 96 parts by weight and said II) is present in an amount of 0.25 to 4 parts by weight.

3. The thermoplastic molding composition of claim 1 further containing at least one additive selected from the group consisting of pigment, filler, internal lubricant, demolding agent and flame retardant.

4. A method of using the composition of claim 1 comprising producing a molded article.

5. The molded article prepared by the method of claim 4.

6. Process for producing the thermoplastic molding composition of claim 1 comprising adding 0.10 to 5 parts by weight of said II) to 99.90 to 95 parts by weight of said I) in the molten state and mixing II) with I).

* * * * *